(12) United States Patent
    Vijayan (10) Patent No.: US 12,188,714 B2
(45) Date of Patent: Jan. 7, 2025

(54) GASKET LEAK DETECTION IN A REFRIGERATOR APPLIANCE

(71) Applicant: Haier US Appliance Solutions, Inc., Wilmington, DE (US)

(72) Inventor: Vineeth Vijayan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 151 days.

(21) Appl. No.: 17/894,474

(22) Filed: Aug. 24, 2022

(65) Prior Publication Data

US 2024/0068742 A1    Feb. 29, 2024

(51) Int. Cl.
    *F25D 29/00*    (2006.01)
    *F25D 23/02*    (2006.01)
    *G06T 7/00*     (2017.01)
    *G08B 21/18*    (2006.01)

(52) U.S. Cl.
    CPC ......... *F25D 29/005* (2013.01); *F25D 23/028* (2013.01); *G06T 7/001* (2013.01); *G08B 21/182* (2013.01); *F25D 2700/02* (2013.01)

(58) Field of Classification Search
    CPC ... F25D 29/005; F25D 23/028; F25D 2700/02
    See application file for complete search history.

(56) References Cited

U.S. PATENT DOCUMENTS

| 10,578,353 | B2  |   | 3/2020 | Seidl et al. |
| 11,122,203 | B1  | * | 9/2021 | Schroeder ................ H04N 7/18 |
| 2003/0132841 | A1 | * | 7/2003 | Alderman ............. F25D 29/008 |
|  |  |  |  | 340/521 |
| 2016/0282039 | A1 | * | 9/2016 | Motukuri ............... F25D 27/005 |

FOREIGN PATENT DOCUMENTS

| CN | 2332975 Y | 8/1999 |
| CN | 209893766 U | 1/2020 |
| CN | 111649527 A | 9/2020 |
| WO | WO-2018040105 A1 * | 3/2018 ............. F25D 11/00 |

OTHER PUBLICATIONS

Shi, System and method for food recognition . . . 2016, Full Document (Year: 2016).*

* cited by examiner

*Primary Examiner* — Nael N Babaa
(74) *Attorney, Agent, or Firm* — Dority & Manning, P.A.

(57) ABSTRACT

A refrigerator appliance is provided including a cabinet defining a chilled chamber, a door rotatably hinged to the cabinet to provide selective access to the chilled chamber, and a light sensing assembly positioned within the chilled chamber. A controller is configured to determine that the door is closed, identify light in the chilled chamber using the light sensing assembly, and provide a user notification in response to identifying the light in the chilled chamber when the door is closed.

20 Claims, 3 Drawing Sheets

GASKET LEAK DETECTION IN A REFRIGERATOR APPLIANCE

FIELD OF THE INVENTION

The present subject matter relates generally to refrigerator appliances, and more particularly light detection assemblies in a refrigerator appliance and methods of operating the same.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Conventional refrigerator appliances include one or more gaskets that are positioned between the cabinet and the door frame to provide an airtight seal when the door is closed. However, such gaskets may commonly be crimped or deformed, the gaskets may lose their resiliency over time, or an object may interfere with the gasket when the door is closed. As a result, improper seals between the door and the cabinet may occur, resulting in poor insulation, increased operating demand and wear on the refrigerator components, and potential for appliance failure and food spoilage. In addition, a leaky gasket may result in the extra intake of moisture, resulting in issues related to the formation of condensate and/or ice buildup on the evaporator and decreased cooling performance. Conventional refrigerator appliances have no means for detecting gasket issues.

Accordingly, a refrigerator appliance with systems for detecting gasket issues would be useful. More particularly, a refrigerator appliance that is capable of detecting gasket leaks, locating such leaks, and providing user notification of such leaks would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance is provided including a cabinet defining a chilled chamber, a door being rotatably mounted to the cabinet to provide selective access to the chilled chamber, a light sensing assembly positioned within the chilled chamber, and a controller operably coupled to the light sensing assembly. The controller is configured to determine that the door is closed, identify light in the chilled chamber using the light sensing assembly, and provide a user notification in response to identifying the light in the chilled chamber when the door is closed.

In another exemplary embodiment, a method of operating a refrigerator appliance is provided. The refrigerator appliance includes a chilled chamber, a door providing selective access to the chilled chamber, and a light sensing assembly positioned within the chilled chamber. The method includes determining that the door is closed, identifying light in the chilled chamber using the light sensing assembly, and providing a user notification in response to identifying the light in the chilled chamber when the door is closed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
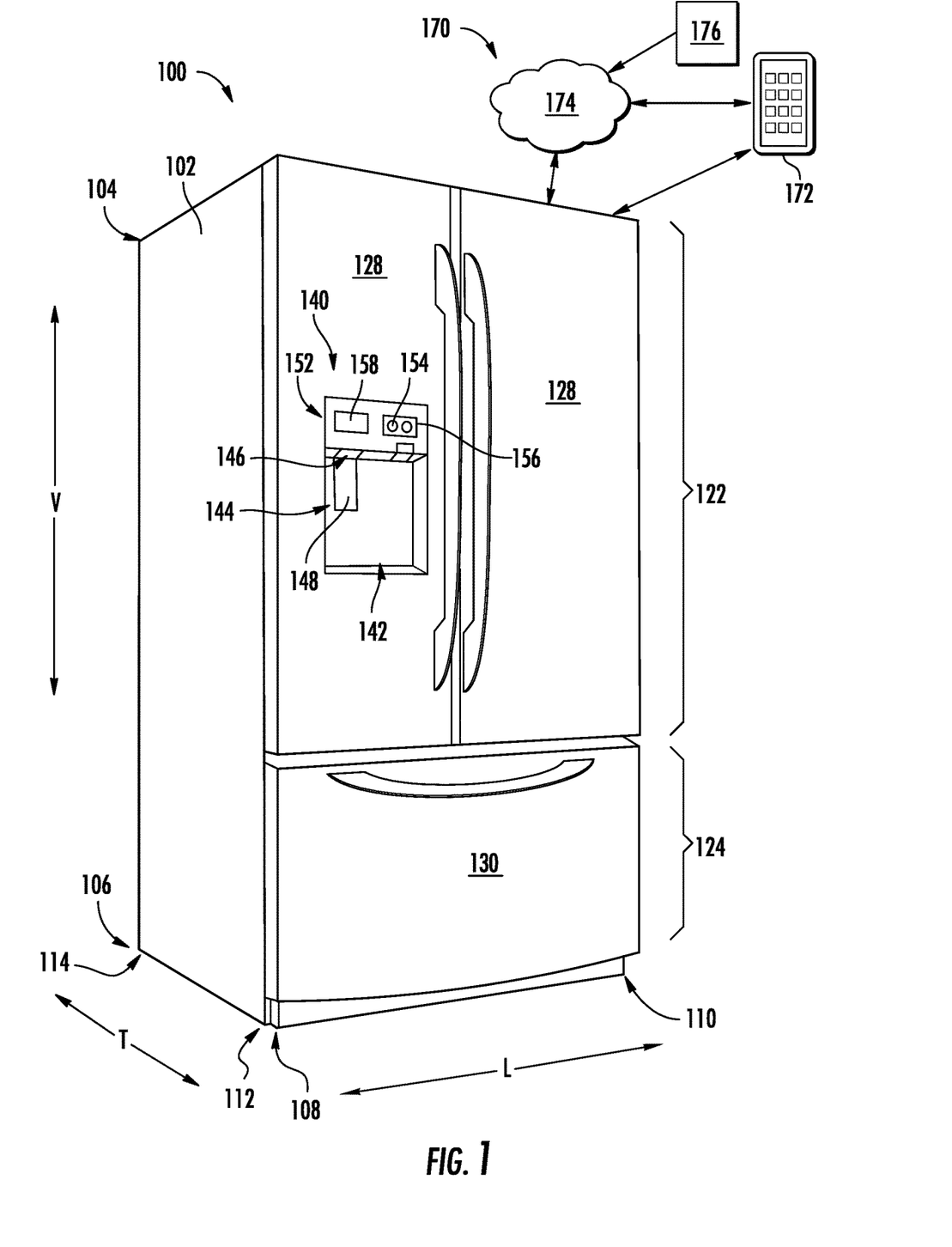
FIG. 1 provides a perspective view of a refrigerator appliance according to an exemplary embodiment of the present subject matter.
Figure 2:
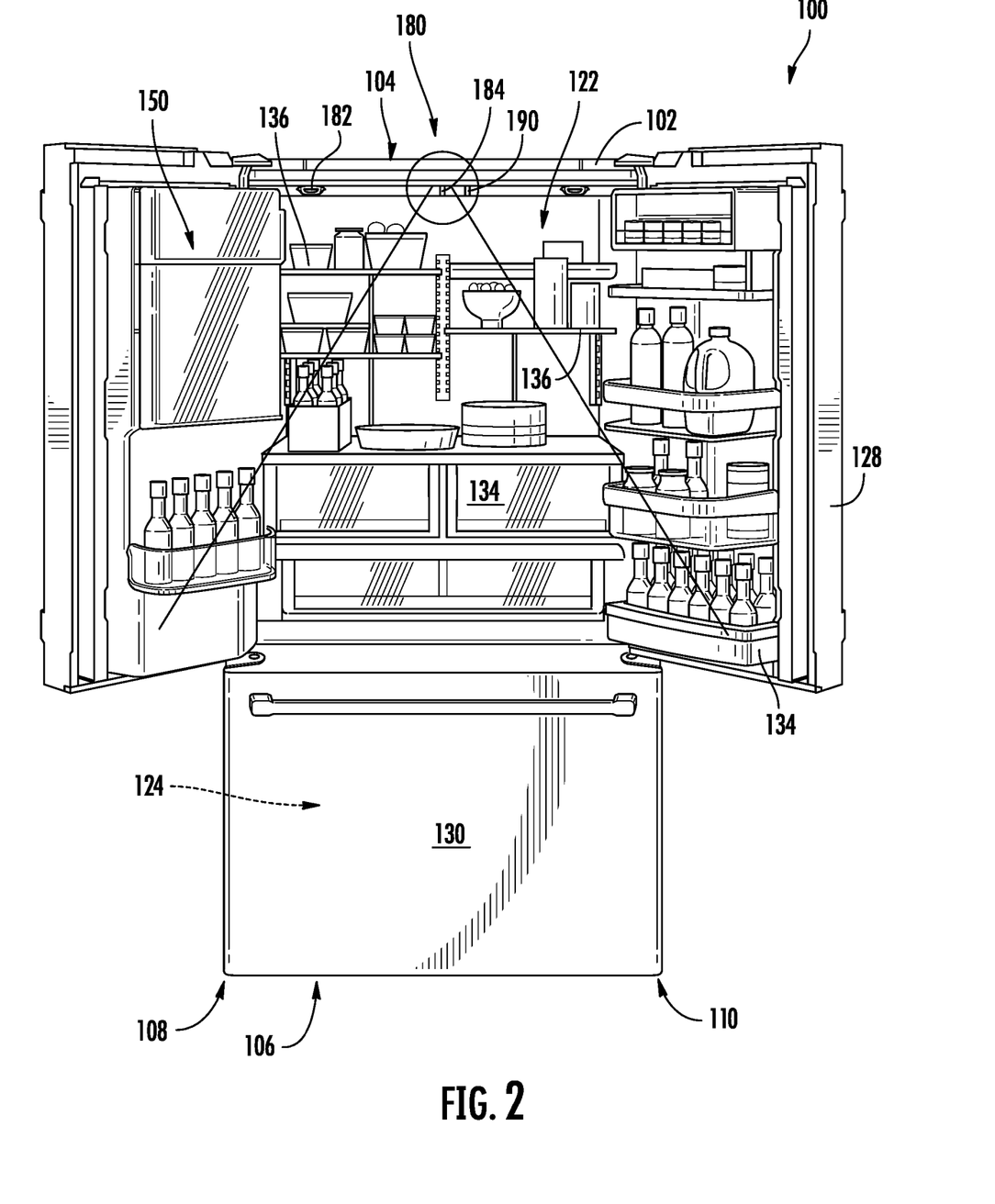
FIG. 2 provides a perspective view of the exemplary refrigerator appliance of FIG. 1, with the doors of the fresh food chamber shown in an open position to reveal a light sensing assembly according to an exemplary embodiment of the present subject matter.

Referring now to the figures, an exemplary appliance will be described in accordance with exemplary aspects of the present subject matter. Specifically, FIG. 1 provides a perspective view of an exemplary refrigerator appliance 100 and FIG. 2 illustrates refrigerator appliance 100 with some of the doors in the open position. As illustrated, refrigerator appliance 100 generally defines a vertical direction V, a lateral direction L, and a transverse direction T, each of which is mutually perpendicular, such that an orthogonal coordinate system is generally defined.

According to exemplary embodiments, refrigerator appliance 100 includes a cabinet 102 that is generally configured for containing and/or supporting various components of refrigerator appliance 100 and which may also define one or more internal chambers or compartments of refrigerator appliance 100. In this regard, as used herein, the terms "cabinet," "housing," and the like are generally intended to refer to an outer frame or support structure for refrigerator appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of refrigerator appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing appliance 102.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. In general, refrigerator doors 128 form a seal over a front opening 132 defined by cabinet 102 (e.g., extending within a plane defined by the vertical direction V and the lateral direction L). In this regard, a user may place items within fresh food chamber 122 through front opening 132 when refrigerator doors 128 are open and may then close refrigerator doors 128 to facilitate climate control. Refrigerator doors 128 and freezer door 130 are shown in the closed configuration in FIG. 1. One skilled in the art will appreciate that other chamber and door configurations are possible and within the scope of the present invention.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touch-screen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156 and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140, and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible by a processing device, including instructions that can be executed by processing device. Optionally, the instructions can be software or any set of instructions and/or data that when executed by the processing device, cause the processing device to perform operations.

Referring still to FIG. 1, a schematic diagram of an external communication system 170 will be described according to an exemplary embodiment of the present subject matter. In general, external communication system 170 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 170 may be used to transfer data or other information to improve performance of one or more external devices or appliances and/or improve user interaction with such devices.

For example, external communication system 170 permits controller 156 of refrigerator appliance 100 to communicate with a separate device external to refrigerator appliance 100, referred to generally herein as an external device 172. As described in more detail below, these communications may be facilitated using a wired or wireless connection, such as via a network 174. In general, external device 172 may be any suitable device separate from refrigerator appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with refrigerator appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control refrigerator appliance 100, etc. In addition, external device 172 and remote server 176 may communicate with refrigerator appliance 100 to communicate similar information. According to exemplary embodiments, remote server 176 may be configured to receive and analyze images or optical feedback obtained by light sensing assembly 180, e.g., to facilitate light detection and/or air leaks.

In general, communication between refrigerator appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with refrigerator appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 3:
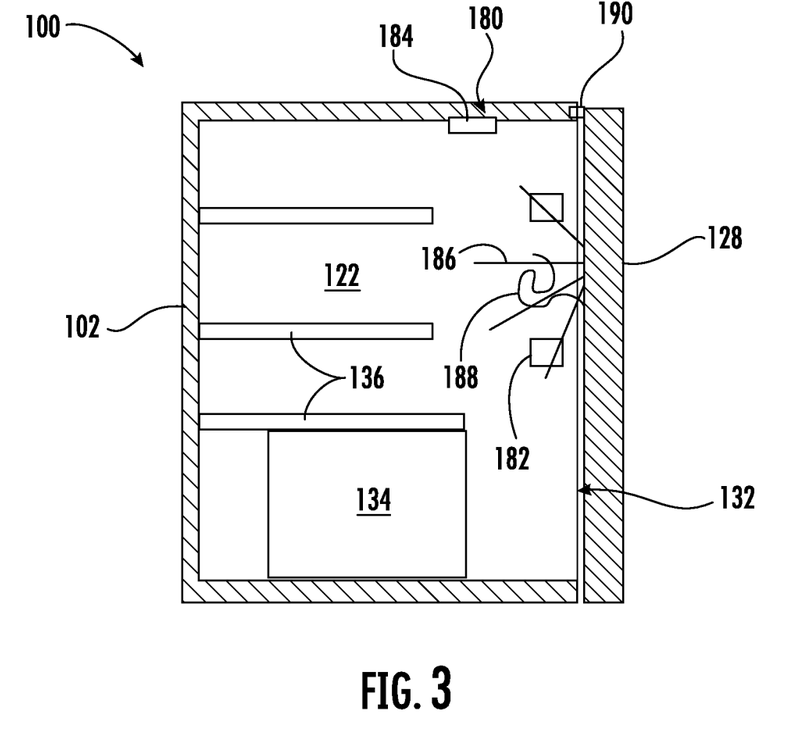
FIG. 3 provides a schematic side view of the exemplary a light sensing assembly of FIG. 2 according to an exemplary embodiment of the present subject matter.

Referring now generally to FIGS. 2 and 3, refrigerator appliance 100 may further include a light sensing assembly 180 that is generally configured to detect light within one or more chambers of refrigerator appliance 100. More specifically, as described in more detail below, light sensing assembly 180 may include one or more light sensors, optical sensors (e.g., identified generally by reference numeral 182), cameras (e.g., identified generally by reference numeral 184), or other detection devices that are capable of detecting light intensity, location, etc. As explained above, detection of such light (e.g., identified generally by reference numeral 186 in FIG. 3) within a chilled chamber may be useful in identifying air leaks (e.g., identified generally by reference numeral 188 in FIG. 3) within the chilled chamber. Detection of such light 186 may facilitate detection and repair of faulty gaskets that need to be repaired or replaced to eliminate air leaks 188.

Although light sensing assembly 180 is described herein as monitoring fresh food chamber 122 for the detection of light 186, it should be appreciated that aspects of the present subject matter may be used to monitor light 186 in any other suitable appliance, chamber, etc. Moreover, it should be appreciated that light sensing assembly 180 may use data obtained from its various sensors to obtain a complete representation or knowledge of the identity, position, intensity, and/or other qualitative or quantitative characteristics of light 186 within fresh food chamber 122.

As shown schematically in FIGS. 2 and 3, light sensing assembly 180 may include one or more cameras 184 that are generally positioned and configured for obtaining images of refrigerator appliance 100 during operation. Specifically, according to the illustrated embodiment, cameras 184 may be mounted to cabinet 102, to doors 128, or are otherwise positioned in view of fresh food chamber 122. Although camera 184 is described herein as being used to monitor fresh food chamber 122 of refrigerator appliance 100, it should be appreciated that aspects of the present subject matter may be used to monitor any other suitable regions of any other suitable appliance, e.g., such as freezer chamber 124. As best shown in FIG. 2, camera 184 is mounted to cabinet 102 at front opening 132 of fresh food chamber 122 and is oriented to have a field of view directed across front opening 132.

According to exemplary embodiments, it may be desirable to position each camera 184 proximate front opening 132 of fresh food chamber 122 and orient each camera 184 such that the field-of-view at least partially covers fresh food chamber 122. In this manner, camera 184 may also be used to facilitate an inventory management process for refrigerator appliance 100. As such, each camera 184 may be positioned at an opening to fresh food chamber 122 to monitor food items that are being added to or removed from fresh food chamber 122 or may monitor such objects after being stored within fresh food chamber 122.

According to still other embodiments, each camera 184 may be oriented in any other suitable manner for monitoring any other suitable region within or around refrigerator appliance 100. It should be appreciated that according to alternative embodiments, camera 184 may include any suitable number, type, size, and configuration of camera(s) 184 for obtaining images of any suitable areas or regions within or around refrigerator appliance 100. In addition, it should be appreciated that each camera 184 may include features for adjusting the field-of-view and/or orientation.

It should be appreciated that the images obtained by camera 184 may vary in number, frequency, angle, resolution, detail, etc. in order to improve the clarity of the particular regions surrounding or within refrigerator appliance 100. Notably, controller 156 of refrigerator appliance 100 (or any other suitable dedicated controller) may be communicatively coupled to camera 184 and may be programmed or configured for analyzing the images obtained by camera 184, e.g., in order to identify light 186, as described in detail below.

In general, controller 156 may be operably coupled to light sensing assembly 180 (e.g., including optical sensor 182 and/or camera 184) for analyzing optical sensor feedback or one or more images obtained by camera 184 to extract useful information regarding light 186 within fresh food chamber 122. In this regard, for example, images obtained by camera 184 may be used to identify the location and intensity of light 186. Notably, this analysis may be performed locally (e.g., on controller 156) or may be transmitted to a remote server (e.g., remote server 176 via external communication network 170) for analysis. Such analysis is intended to facilitate light detection and leak elimination.

Now that the construction and configuration of refrigerator appliance 100 and camera 184 have been presented according to an exemplary embodiment of the present subject matter, an exemplary method 200 for operating a camera 184 is provided. Method 200 can be used to operate camera 184, or to operate any other suitable camera assembly for detecting light or air leaks. In this regard, for example, controller 156 may be configured for implementing method 200. However, it should be appreciated that the exemplary method 200 is discussed herein only to describe exemplary aspects of the present subject matter and is not intended to be limiting.

Figure 4:
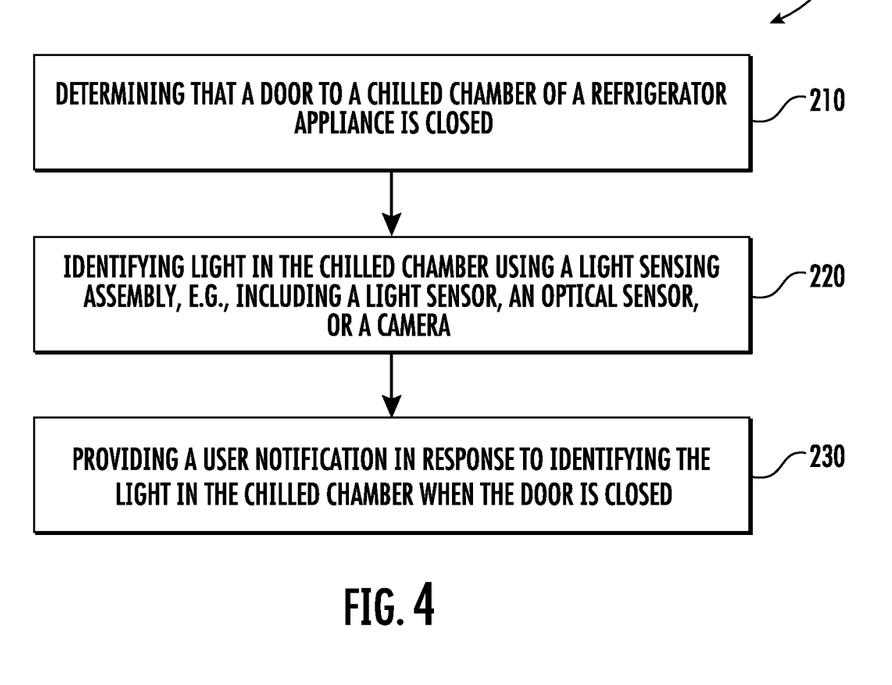
FIG. 4 provides a method for operating the light sensing assembly of FIG. 2 according to an exemplary embodiment of the present subject matter.

As shown in FIG. 4, method 200 includes, at step 210, determining that a door to a chilled chamber of a refrigerator appliance is closed. In this regard, continuing the example from above, step 210 may include determining that refrigerator door 128 to fresh food chamber 122 is closed. This determination may be made by controller 156 in any suitable manner and using any suitable number and types of sensors. For example, refrigerator appliance 100 may include a door switch or door sensor 190 that detects when refrigerator door 128 is closed.

In certain situations, a user of refrigerator appliance 100 may close the refrigerator door 128 in a manner that triggers door sensor 190 but where a proper seal is not obtained. In addition, a faulty door sensor 190 may also indicate that the refrigerator door 128 is closed when in fact it is open or partially open. Accordingly, the detection of light 186 in such situations may be useful in detecting a faulty door sensor 190, an improperly closed refrigerator door 128, or perhaps a situation where an object within the fresh food chamber 122 is contacting the gasket to prevent a proper seal.

According to still other example embodiments, step 210 of determining that the door to the chilled chamber is closed may include using light sensing assembly 180 to determine that the light within fresh food chamber has dropped below a threshold level that indicates that the door is closed. For example, this threshold light level may be selected to ensure that the door is determined to be closed even in the event that there is some light leakage into the fresh food chamber 122. In addition, light sensing assembly 180 may be used to detect a dispersion of light within the field-of-view. For example, if the light detected is localized, controller may determine that the door is closed and the localized light is a leak. By contrast, if the detected light is dispersed evenly, controller 156 may determine that the door is open.

Step 220 includes identifying light in the chilled chamber using a light sensing assembly, e.g., including a light sensor, an optical sensor, or a camera. In this regard, continuing the example from above, light sensing assembly 180 may be used to detect light 186 within fresh food chamber 122. Notably, if refrigerator door 128 is closed (e.g., as determined at step 210) and light is detected (e.g., as determined at step 220), controller 156 may conclude that there is a faulty gasket, a faulty door sensor, or another blockage that might be causing light 186 to enter fresh food chamber 122, an air leak 188, etc.

According to an example embodiment, identifying light 186 in fresh food chamber 122 may include obtaining one or more images using the camera 184 and identifying the light by analyzing the one or more images. In this regard, for example, controller 156 may be configured to identifying a pixel brightness of the one or more images. For example, a pixel brightness for each pixel of an image when the door is closed should be zero. Accordingly, a pixel brightness that is greater than zero or that exceeds some predetermined light level threshold may indicate a leakage of light 186. Notably, by identifying the pixel locations where light is detected, controller 156 may also detect the precise location or locations where light 186 is leaking through the door gasket.

Notably, light sensing assembly 180 may obtain light measurements upon any suitable trigger, e.g., time-based, based on the door position, etc. For example, optical sensor 182 may obtain light measurements and/or camera 184 may obtain images upon any suitable trigger, such as when door sensor 190 indicates that refrigerator door 122 has been closed. Notably, optical sensor 182 may operate in a manner similar to camera 184, e.g., by sensing light levels at various locations within a sensing area.

According to still other embodiments, identifying light 186 in fresh food chamber 122 may include analyzing the image using any suitable image analysis techniques, image decomposition, image segmentation, image processing, etc. This analysis may be performed entirely by controller 156, may be offloaded to a remote server for analysis, may be analyzed with user assistance (e.g., via control panel 152), or may be analyzed in any other suitable manner. According to exemplary embodiments of the present subject matter, the analysis performed at step 220 may include a machine learning image recognition process.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor a moving object within fresh food chamber 122. It should be appreciated that this image analysis or processing may be performed locally (e.g., by controller 156) or remotely (e.g., by offloading image data to a remote server or network, e.g., remote server 176).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities and/or differences between the reference image and the obtained image may be used to extract useful information for improving appliance performance. For example, image differentiation may be used to determine when a pixel level motion metric passes a predetermined motion threshold.

The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image. In addition, or alternatively, the image processing algorithms may use other suitable techniques for recognizing or identifying particular items or objects, such as edge matching, divide-and-conquer searching, greyscale matching, histograms of receptive field responses, or another suitable routine (e.g., executed at the controller 156 based on one or more captured images from one or more cameras). Other image processing techniques are possible and within the scope of the present subject matter.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

After the door is determined to be closed (e.g., at step 210) and light is detected (e.g., at step 220), step 230 may include providing a user notification in response to identifying the light in the chilled chamber when the door is closed. For example, step 220 may include sounding an alarm (e.g., via control panel 152) or providing some other suitable indicator on display 158 when light is detected and the door is closed.

According to still other embodiments, the user notification may be provided directly to the user through a remote device 172 (e.g., such as through a software application on the user's cell phone) over network 174. According to exemplary embodiments, this user notification may provide a user with details related to the light condition, such as an image showing the location of the detected light 186, the state of the door sensor 190, or any other suitable qualitative or quantitative information related to the light 186 or air leaks 188 within fresh food chamber 122. In addition, the user notification may include recommended maintenance steps to fix the issue or may include an automated method for scheduling a maintenance visit.

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using refrigerator appliance 100 as an example, it should be appreciated that this method may be applied to the operation of any suitable refrigerator appliance or any other appliance where light detection is desirable.

As explained above, aspects of the present subject matter are generally directed to systems and methods for detecting a gasket failure or an otherwise poor seal in a refrigerator. In this regard, for example, top or side mounted cameras or light sensors within the refrigerator may be used to detect the poor gasket seal by detecting luminosity or brightness of a light from the exterior that shines through gaps. For example, light level is assessed via the camera by taking a pixel-average brightness value while a door is closed and the internal lights are off. For a good seal, the average camera brightness value is zero. According to example embodiments, for one or more light sensors, aspects of the present subject matter assess a single provided value per sensor on an appropriate scale. For a large gasket leakage issue, the present subject matter may also detect a clear location depending on the camera position and leak position that facilitate the communication of alerts to a user with air-leak location via a mobile application. For one or more smaller leaks, alerts may be provided with a general light without directionality. Further, the user may be advised about the air leakage issue, how to assess and repair it, or recommend that the user call for service.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably mounted to the cabinet to provide selective access to the chilled chamber, the door comprising a gasket;
   a light sensing assembly positioned within the chilled chamber; and a controller operably coupled to the light sensing assembly, the controller being configured to:
  determine that the door is closed;
  identify light coming into the chilled chamber through or around the gasket using the light sensing assembly; and
  provide a user notification in response to identifying the light coming into the chilled chamber when the door is closed.

2. The refrigerator appliance of claim 1, wherein the light sensing assembly is a light sensor or an optical sensor.

3. The refrigerator appliance of claim 1, wherein the light sensing assembly is a camera assembly, and wherein identifying the light in the chilled chamber comprises:
  obtaining one or more images using the camera assembly; and
  identifying the light by analyzing the one or more images.

4. The refrigerator appliance of claim 3, wherein identifying the light by analyzing the one or more images comprises identifying a pixel brightness of the one or more images.

5. The refrigerator appliance of claim 3, wherein identifying the light by analyzing the one or more images comprises using a machine learning image recognition process.

6. The refrigerator appliance of claim 5, wherein the machine learning image recognition process comprises at least one of a convolutional neural network ("CNN"), a region-based convolutional neural network ("R-CNN"), a deep belief network ("DBN"), or a deep neural network ("DNN") image recognition process.

7. The refrigerator appliance of claim 1, wherein the controller is further configured to:
  provide the user notification including an image showing the location of the light.

8. The refrigerator appliance of claim 1, wherein the controller is in operative communication with a remote device and is configured for transmitting the user notification when the light is identified and the door is closed.

9. The refrigerator appliance of claim 1, wherein the camera assembly comprises:
  a camera mounted at a top of the chilled chamber.

10. The refrigerator appliance of claim 1, wherein the controller is further configured to:
  sound an alarm when the light is detected and the door is closed.

11. The refrigerator appliance of claim 1, further comprising:
  a door sensor operably coupled to the door of the refrigerator appliance, wherein the controller is in operative communication with the door sensor and is configured to identify the light when the door is closed.

12. A method of operating a refrigerator appliance, the refrigerator appliance comprising a chilled chamber, a door providing selective access to the chilled chamber and comprising a gasket, and a light sensing assembly positioned within the chilled chamber, the method comprising:
  determining that the door is closed;
  identifying light coming into the chilled chamber through or around the gasket using the light sensing assembly; and
  providing a user notification in response to identifying the light coming into the chilled chamber when the door is closed.

13. The method of claim 12, wherein the light sensing assembly is a light sensor or an optical sensor.

14. The method of claim 12, wherein the light sensing assembly is a camera assembly, and wherein identifying the light in the chilled chamber comprises:
  obtaining one or more images using the camera assembly; and
  identifying the light by analyzing the one or more images.

15. The method of claim 14, wherein identifying the light by analyzing the one or more images comprises identifying a pixel brightness of the one or more images.

16. The method of claim 14, wherein identifying the light by analyzing the one or more images comprises using a machine learning image recognition process.

17. The method of claim 16, wherein the machine learning image recognition process comprises at least one of a convolutional neural network ("CNN"), a region-based convolutional neural network ("R-CNN"), a deep belief network ("DBN"), or a deep neural network ("DNN") image recognition process.

18. The method of claim 12, further comprising:
  providing the user notification including an image showing the location of the light.

19. The method of claim 12, wherein the controller is in operative communication with a remote device and is configured for transmitting the user notification when the light is identified and the door is closed.

20. The method of claim 12, further comprising:
  sounding an alarm when the light is detected and the door is closed.

* * * * *